May 19, 1925.  1,538,488
P. PASCUCCI
TIRE PUMP
Filed July 2, 1924
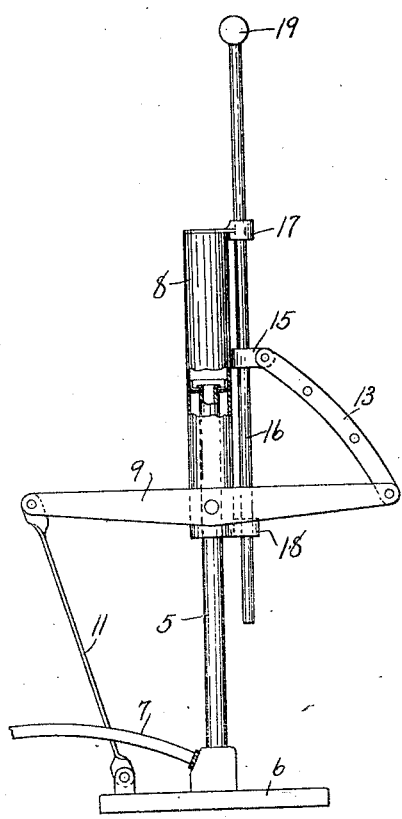
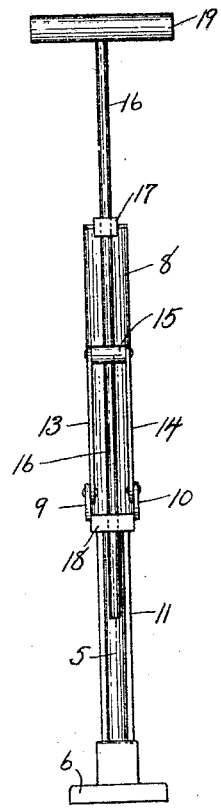
Inventor
Pietro Pascucci
by Seymour & Earle
attys Patented May 19, 1925.

1,538,488

UNITED STATES PATENT OFFICE.

PIETRO PASCUCCI, OF MERIDEN, CONNECTICUT.

TIRE PUMP.

Application filed July 2, 1924. Serial No. 723,653.

*To all whom it may concern:*

Be it known that I, PIETRO PASCUCCI, a subject of the King of Italy, residing at Meriden, in the county of New Haven and State of Connecticut, have invented a new and useful Improvement in Tire Pumps; and I do hereby declare the following, when taken in connection with the accompanying drawings and the characters of reference marked thereon, to be a full, clear, and exact description of the same, and which said drawings constitute part of this application, and represent, in—

Fig. 1 a side view of a tire pump constructed in accordance with my invention;

Fig. 2 an edge view of the same.

This invention relates to improvement in tire pumps and particularly to pumps for this purpose which are provided with levers and links between the cylinder and piston, to increase the pressure or power of the pump. The object of this invention is a simple arrangement of parts for accomplishing this purpose, and the invention consists in the construction as hereinafter described and particularly recited in the claims.

In carrying out my invention, I employ a hollow piston 5 mounted on a base 6, the piston opening into the usual flexible tube 7. Setting over the piston is a cylinder 8. Secured to opposite sides of the cylinder, at its lower end, are levers 9 and 10, arranged parallel with each other. One end of each lever is connected by a link 11 with the base 6, and the other end of each lever is connected by links 13 and 14, respectively, with a collar 15 fixed to an operating-rod 16, which is guided for vertical movement by eyes 17 and 18 fixed to opposite ends of the cylinder, the collar 15 being arranged between the eyes. The operating-rod is provided with the usual operating-handle 19.

A downward movement of the operating-rod forces the collar 15 downward and, through the links 13 and 14, moves the levers 9 and 10 so as to force the cylinder 8 downwardly, over the hollow piston 5 and so force air upward through the tube 7. The link 11 moves toward the piston and cylinder on the downward movement of the operating-rod. The reverse movement of the operating-rod raises the cylinder and reverses the movement of the levers and links. With this construction, the force applied to the operating-handle is multiplied, so that the pressure of air produced by moving the cylinder downward over the piston is increased.

I claim:

1. A tire pump, comprising a base, a hollow piston rigidly mounted thereon, an outlet for said piston, a cylinder set over the upper end of the piston, a lever pivotally connected with the cylinder and projecting from the opposite sides thereof, a link connecting one end of the lever with the base, an operating-rod guided for vertical movement with the cylinder, and a link connecting the opposite end of the lever with said operating-rod.

2. A tire pump, comprising a base, a hollow piston mounted thereon, an outlet for said piston, a cylinder set over said piston, said cylinder provided at its ends with eyes, an operating-rod passing through said eyes, a collar fixed to said operating-rod, levers pivoted to opposite sides of the said cylinder, a link connecting adjacent ends of the levers with the base, and links connecting the opposite ends of said levers with said collar.

In testimony whereof I have signed this specification in the presence of two subscribing witnesses.

PIETRO PASCUCCI.

Witnesses:
FREDERIC C. EARLE,
MALCOLM P. NICHOLS.